TWO-STATION PARTY LINE SWITCHING IN TELEPHONE SYSTEMS
Filed April 21, 1955
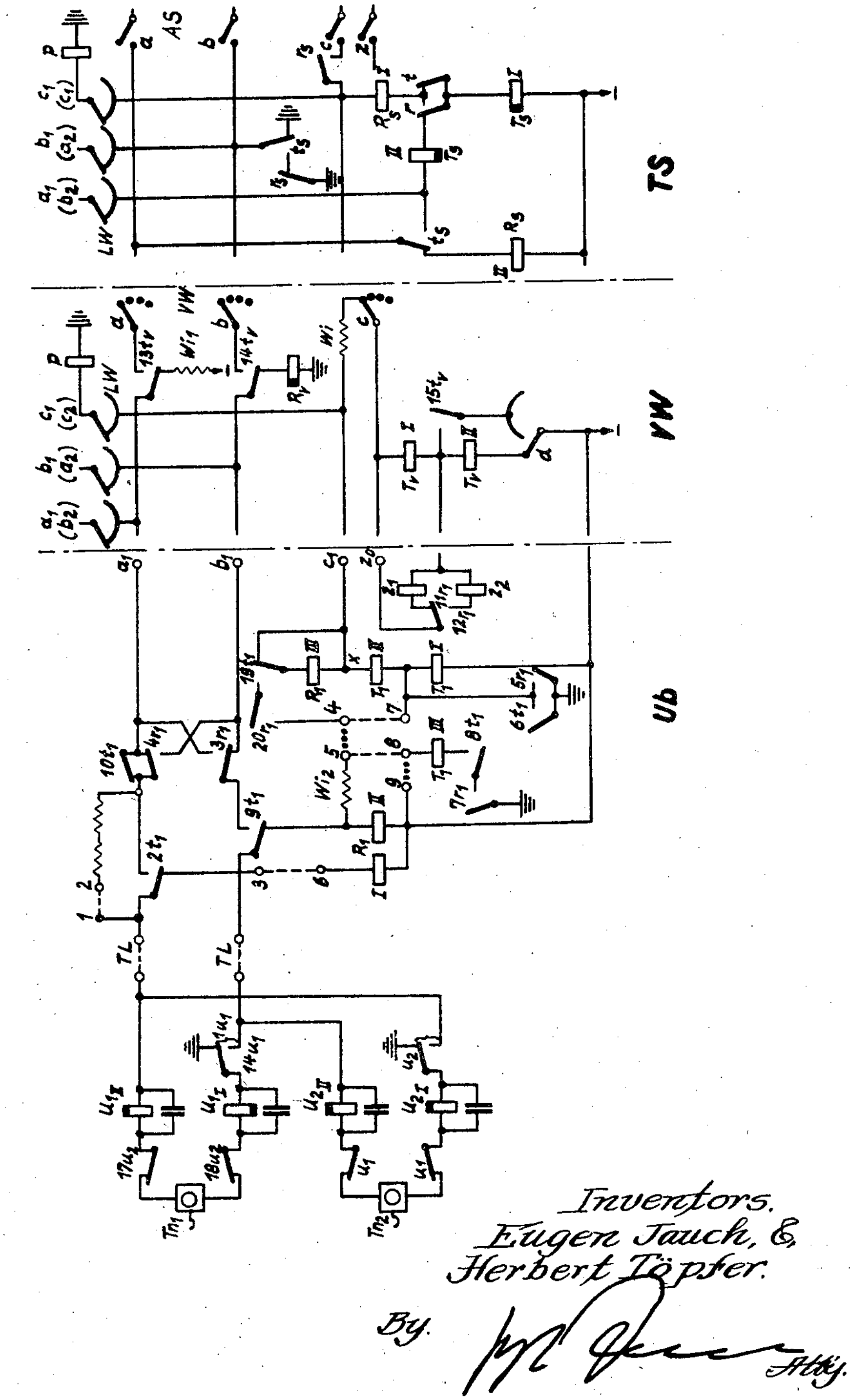
Inventors.
Eugen Jauch, &
Herbert Töpfer.
By. [signature] Atty.

United States Patent Office 2,923,775
Patented Feb. 2, 1960

2,923,775

TWO-STATION PARTY LINE SWITCHING IN TELEPHONE SYSTEMS

Eugen Jauch and Herbert Töpfer, Munich, Germany, assignors to Siemens & Halske Aktiengesellschaft, Munich, Germany, a corporation of Germany Application April 21, 1955, Serial No. 502,902
In Germany April 29, 1949

Public Law 619, August 23, 1954
Patent expires April 29, 1969

12 Claims. (Cl. 179—17)

This invention is concerned with two-station party line switching in telephone systems.

As is well known, party lines are characterized by the provision of a single exchange line which is allocated to several stations for effecting outgoing and incoming calls in accordance with conditions and requirements customary in telephone operation, such as metering of the calls, secrecy of the conversation, etc. In so-called two-station party lines, two telephone stations are connected to a single exchange line, the operative connection of said stations being controlled by gate relays disposed at the corresponding stations. For incoming calls, the connectors which seize the two-station party line have two outlets for the respective parties. The ringing of the individual stations is effected over either one or the other of the line or talking conductors. Up to the present time, outgoing calls from the two stations were extended over line circuits associated either with a preselector or a line finder. In order to take care of outgoing calls, it is furthermore necessary to provide an adapter disposed ahead of the preselector or line finder employed for extending outgoing calls.

Up to the present time it was not possible to use for two-station party lines preselector or line-finder circuits employed for normal individual subscriber lines. Changes had to be made in the circuits, which was particularly disturbing when it was desired to install two-station party lines after completion of exchange equipment. Furthermore, special adapters had to be provided, depending on the preselector or line-finder system used.

The purpose of the present invention is to provide for two-station party line operation, a single adapter both for preselector operation and for line-finder operation, using normal preselector or line-finder circuits so that even in case of the subsequent installation of such party lines, no changes in the existing circuits are necessary. This object is achieved in accordance with the present invention, by operatively affecting switching means allocated to the adapter, which upon the beginning of a connection supervise the switching through of the lines and their disconnection at the end of the call, from the exchange connecting devices such as preselectors, line finders or connectors over auxiliary conductor means, for instance, over a test or private conductor.

The various objects and features of the invention will now be described with reference to the accompanying drawing showing one embodiment thereof.

The two subscriber stations T*n*1 and T*n*2 shown in the drawing are connected to the line TL. There is provided a slow-to-release relay U1 having windings respectively disposed in the two line conductors allotted to the subscriber T*n*1 while a slow-to-release relay U2 is allotted to subscriber T*n*2 with windings respectively disposed in the corresponding line conductors.

At the exchange side of the line TL, there is provided an adapter unit U*b* over which may be reached, depending on the existing system, in outgoing calls, a first preselector VW or, in line-finder operation, the line circuit TS. In incoming calls, the adapter is seized by a connector LW. The circuits which are respectively used in preselector or line-finder (AS) operation are shown in the drawing at the right of the vertical dot-dash lines. The respective preselector or line circuit is to be connected to the adapter at the points *a*1, *b*1, *c*1, *zo* and *a*1, *b*1, *c*1, respectively. In the case of preselector operation, points 3—6 and 4—7 in the adapter are connected together (dash lines), and in the case of line-finder operation, points 1—2, 5—4 and 9—8 are connected together (dotted lines).

*Outgoing calls with preselector operation*

If the subscriber T*n*1 wishes to extend a call, the seizure of the adapter U*b* is effected over the upper line conductor leading to the terminal *a*1. Upon the removal of the receiver, a circuit is closed for energizing relay R1 in the adapter, such circuit extending from ground, 1*u*1, U1–I, 18*u*2, subscriber loop, 17*u*2, U1–II, upper line conductor TL, 2*t*1, R1–I, to battery. Relay R1 energizes in this circuit while relay U1 remains normal. Relay R1 closes its contact 5*r*1 thereby closing a circuit for the winding I of relay T1 and also for the opposing winding II of such relay, the latter circuit extending from ground, 5*r*1, T1–II, terminal *c*1, resistor W*i*, private wiper *c* of the preselector in home position, T*v*I and II, wiper *d* of the preselector, to battery. Relay T1 accordingly remains for the time being at normal. Relay R1 also actuates its contact 4*r*1, thereby closing a circuit for the line relay R*v* of the preselector VW from ground, R*v*, 14*tv*, lower line conductor, 4*r*1, 10*t*1, upper line conductor, terminal *a*1, 13*tv*, resistor W*i*1, to battery. Relay R*v* causes the preselector VW to operate in known manner.

As soon as the preselector has moved its wipers out of the home position, the circuit of the opposing winding II of relay T1 is opened at wiper *c*, and relay T1 energizes, thereby disconnecting relay R1 from the line conductors and switching the line conductors through at contacts 2*t*1 and 9*t*1. Relay R1 releases after energization of relay T1 due to current flow through its oppositely connected holding winding III. Relay T1 remains energized over its winding I and contact 6*t*1. After the release of relay R1, the call meter Z1 of subscriber T*n*1 is preparatorily connected to the metering conductor *zo*.

After the switching through of the line conductors at contacts 2*t*1 and 9*t*1 of relay T1, the current for the starting relay R*v* of the preselector flows over the subscriber loop. The relay U1 at the calling subscriber station T*n*1 energizes in the starting circuit over the low resistance of the resistor W*i*1 and connects the lower line conductor through at contact 14*u*1, thereby reclosing the loop. At the same time, contacts *u*1 in the circuit of the other party-line subscriber T*n*2 are opened so as to disconnect such other subscriber.

When the preselector VW finds an idle trunk leading to a first group selector, the test relay T*v* energizes in known manner. Relay T*v* extends the two line conductors at its contacts 13*tv* and 14*tv* and by shunting its high resistance winding II at contact 15*tv*, busies the seized trunk. Relay U1 at the subscriber's station remains energized over the line loop by current from the battery feed bridge in the seized first group selector.

The remaining operations in extending the call have no bearing on the present invention and a description thereof is therefore omitted.

Upon completion of the call, the calling subscriber restores the receiver, thereby interrupting the line loop and causing in known manner release of the line or battery feed relays in the first group selector. This results in opening of the test or private conductor extending from the first group selector to the preselector VW, thereby causing release of the test relay T*v* which in turn initiates the homing operation of the preselector. When the preselector has returned to home position, the opposing winding II of relay T1 in the adapter U*b* again receives current; relay T1 deenergizes as a result of which the adapter is also returned to normal position.

Upon a call from the station T*n*2, the adapter U*b* is seized over the lower line conductor leading to the terminal marked *b*1. Relay R1 is in such case energized in a circuit extending from ground, contact *u*2, U2–I, *u*1, switch hook contacts, *u*1, U2II, lower line conductor, contact 9*t*1, winding II of relay R1, to battery. Relay R1 energizes but relay U2 at the subcriber's station remains normal. Relay R1 again prepares the circuit for the two windings of relay T1, the latter relay however remaining for the time being at normal. A circuit is closed for the starting relay R*v* of the preselector, as described before, and the preselector is accordingly operated. As soon as it has left its home position, relay T1 in the repeater U*b* energizes, extending the line conductors. Relay R1 does not deenergize in this case, after the actuation of relay T1, but continues to hold in a circuit extending from ground, 7*r*1, 8*t*1, T1–III, 8—5, W*i*2, R1–II, to battery. The call meter Z2 of the subscriber T*n*2 is in this manner connected over contact 12*r*1, and the line conductors are reversed in order to maintain the energizing circuit for relay R*v* and for the switching relay U2. After the line conductors have been extended upon actuation of relay T1, relay U2 at the subscriber's station energizes and completes the line loop by actuating contact *u*2. At contacts 17*u*2 and 18*u*2, relay U2 disconnects the subscriber's station T*n*1, in a similar manner as the subscriber's station T*n*2 was disconnected at contacts *u*1 of relay U1 incident to the call extended from station T*n*1.

Upon restoration of the preselector VW into its home position, relay R1 deenergizes first, followed by deenergization of relay T1. This sequence is necessary in order to avoid relay R1 being erroneously held actuated by a shunt possibly present on the subscriber's line. As may be seen from the circuit, the low resistance winding III of relay R1 is during the connection disposed in series with the high resistance winding II of relay T1 in a shunt circuit over contacts 19*t*1 and 20*r*1. This shunt is removed when the preselector returns to home position. A potential is present at the connecting point X between the windings R1–III and T1–II. As a result, winding II of relay T1 remains for the time being inoperative while the opposing winding III of relay R1 becomes operative to cause restoration of relay R1. Upon restoring, relay R1 disconnects the holding winding III of relay T1 at contact 7*r*1 and the potential at the connecting point X is eliminated. The opposing winding II of relay T1 now becomes operative, causing release of relay T1, thus returning the repeater to normal.

*Outgoing calls in line-finder operation*

When the repeater U*b* is seized in a call from the subscriber T*n*2, relay R1 is energized over the lower line conductor and remains energized during the call as described in connection with the preselector operation. The subsequent switching operations also correspond to those described before. However, the opposing winding II of relay T1 is energized over the private conductor *c* and windings I of relays R*s* and T*s* to battery. The test relay T*s* of the subscriber line circuit TS cannot energize over the high resistance winding II of the relay T1. Upon extending the two line conductors, the starting relay R*s* of the subscriber's line circuit TS is energized. Relay RS initiates the operation of the line finder in known manner. When the line finder has found the calling line, a busy potential is connected in a test circuit to the private conductor *c*, from the line finder, thereby shunting the opposing winding II of the relay T1 and causing it to energize. Parallel to relay T1, relay R1 is held energized by the busy potential on the private conductor *c* over its winding III, 19*t*1, 20*r*1, 4—5, W*i*2, R1–II, to battery.

The remaining switching operations correspond to those described in connection with the preselector operation.

Upon termination of the call, ground on the test or private conductor is in known manner removed in the line finder and the holding circuit for the two windings III and II of relay R1 is thereby opened. Relay R1 deenergizes, opening the holding circuit for winding III of relay T1. Relay R1 and thereupon relay T1 are in this manner deenergized.

When a call is extended, in the line finder operation, from station T*n*1, relay R1 is not actuated. Due to the bridging of the points 1—2 in the adapter U*b*, after the closing of the switch hook contact responsive to removal of the receiver by the calling subscriber, the starting relay R*s* in the subscriber's line circuit TS is directly connected to the line conductor *a*. The gate relay U1 included in this circuit remains normal for the time being. The line finder is again caused to operate responsive to the actuation of relay R*s*. As soon as it has found the calling line, it applies busy potential to the private conductor *c*. Relay T1 energizes over both windings I and II and extends the line conductors.

Upon release of the call, ground is disconnected from the private conductor in the line finder and winding II of relay T1 in series with the two windings I of relays R*s* and T*s* in the subscriber line circuit again becomes operative. Relay T1 releases, returning the adapter U*b* to normal.

*Incoming calls*

In incoming calls to either one of the party line stations, positive busy potential (ground) is connected to the private conductor *c* by the test relay P of the connector LW seizing the adapter U*b*. The relay T1 of adapter U*b*, the two windings of which are in series in this case, is accordingly energized over the test conductor *c*1, while the test relay T*v* is energized in parallel therewith in a circuit over the private wiper *c* of the preselector VW in home position thereof. In case of line-finder operation, relays R*s* and T*s* of subscriber line circuit TS will energize over the test conductor *c*1 in parallel to the relay T1 of the adapter. The respective test relay of the corresponding preselector or line finder device disconnects in known manner the starting relay from the line conductors. Relay T1 of the adapter U*b* extends the two line conductors. The ringing current for subscriber T*n*1 transmitted by the connector passes over the line conductor *a* and ground. If subscriber T*n*2 is called, the ringing current passes over the line conductor *b* and ground. When the called subscriber answers, the associated switching relay U1 or U2 energizes and connects the line conductors to the called subscriber station while disconnecting the other station.

Upon release of the call, the busy potential is removed from the test conductor in the connector. The opposing winding II of relay T1 is thereby actuated in a circuit extending from ground, 6*t*1, T1–II, conductor *c*1, W*i*, wiper *c* of the preselector in home position, windings I and II of relay T*v*, wiper *d* of the preselector in home position to battery. Relay T1 deenergizes and returns the adapter U*b* to normal.

In case of line-finder operation, similar switching operations take place which may easily be traced in the circuit based on explanations rendered before.

Changes may be made within the scope and spirit of the appended claims.

We claim:

1. In a telephone system having an exchange including a switching device, a connector, a preselector and a line finder; a circuit arrangement for two-station party line switching comprising a gate relay at each station connected to a party line for disconnecting the other station respectively incident to outgoing calls extended therefrom over said exchange switching device and incident to incoming calls extended thereto from said connector in the exchange, an adapter disposed in the exchange, said adapter being individual to said party line and directly connected with the line conductors extending therefrom, said adapter conditioning said party line respectively for operation with said preselector having wipers for extending calls to said exchange switching device and also for operation with said line finder cooperating with said exchange switching device and having line and private conductors for selective connection with corresponding conductors respectively associated with line circuits respectively individual to a preselector or a line finder, a differential control relay in said adapter for respectively extending the line conductors thereof incident to outgoing calls from and incoming calls to a station on said party line and for disconnecting said line conductors at the termination of the corresponding calls, the gate relay at the corresponding station energizing responsive to extension of said line conductors by said differential control relay to disconnect the other station, and circuit means including a private conductor of said adapter and respectively controlled by said exchange switching device incident to outgoing calls and by said connector incident to incoming calls for governing the operation of said control relay means.

2. A circuit arrangement according to claim 1, comprising a line relay in said adapter, means for respectively energizing said line relay over one of said line conductors responsive to a call extended from one of said stations and over the other line conductor responsive to a call extended from the other station, means for deenergizing said line relay when energized over one of said line conductors, means for holding said line relay operated responsive to actuation thereof over the other line conductor, a call meter for each station, and means controlled by said line relay for governing the actuation of the call meter of the station respectively involved in a call.

3. A circuit arrangement according to claim 1, comprising a line relay in said adapter, means for respectively energizing said line relay over one of said line conductors responsive to a call extended from one of said stations and over the other line conductor responsive to a call extended from the other station, means for deenergizing said line relay when energized over one of said line conductors, means for holding said line relay operated responsive to actuation thereof over the other line conductor, a call meter for each station, means controlled by said line relay for governing the actuation of the call meter of the station respectively involved in a call, a start relay for the preselecting device cooperating with said adapter, and circuit means controlled by said line relay for closing a line loop for the actuation of said start relay.

4. A circuit arrangement according to claim 1, comprising a line relay in said adapter, means for respectively energizing said line relay over one of said line conductors responsive to a call extended from one of said stations and over the other line conductor responsive to a call extended from the other station, means for deenergizing said line relay when energized over one of said line conductors, means for holding said line relay operated responsive to actuation thereof over the other line conductor, a call meter for each station, means controlled by said line relay for governing the actuation of the call meter of the station respectively involved in a call, a start relay for the preselecting device cooperating with said adapter, and circuit means controlled by said line relay for closing a circuit for the actuation of said start relay extending over a line conductor from the calling station to said adapter in series with the other line conductor extending from said adapter to said preselecting device.

5. A circuit arrangement according to claim 1, comprising means for releasing said differential relay upon termination of the corresponding call to disconnect said line conductors.

6. A circuit arrangement according to claim 5, comprising means effective while a call is in progress for energizing one winding of said differential relay by connecting a predetermined fixed potential thereto, and means controlled by said exchange switching device for selectively connecting to the other winding of said differential relay potentials of different values so as to control the actuation thereof.

7. A circuit arrangement according to claim 6, comprising means effective upon utilizing said adapter in an outgoing call for energizing one of said windings of said differential relay in a local circuit, and means including said private conductor for energizing the other winding of said differential relay in opposite sense.

8. A circuit arrangement according to claim 7, comprising a preselector cooperating with said adapter, said differential relay being in normal position when said preselector is in home position, and circuit means for actuating said differential relay responsive to actuation of said preselector.

9. A circuit arrangement according to claim 7, comprising a line finder cooperating with said adapter, a test circuit for said line finder, means comprising said test circuit for actuating said differential relay when said line finder seizes the party line responsive to the initiation of a call at a station on such line, said differential relay restoring upon interruption of said test circuit at the termination of the corresponding call.

10. A circuit arrangement according to claim 6, comprising a preselector device cooperating with said adapter, a test circuit for said preselector device, a connector for extending an incoming call to said party line, a test circuit for said connector, means effective incident to an incoming call from said connector for energizing both windings of said differential relay in the test circuit of said connector in parallel to the test circuit of the preselecting device.

11. A circuit arrangement according to claim 6, comprising a preselecting device cooperating with said adapter, means effective incident to an incoming call from a connector for energizing said differential relay, means for shunting one winding of said differential relay while the corresponding call is in progress so as to keep such relay energized, and means for removing said shunt at the termination of said call so as to effect said winding operatively over the test circuit of said preselecting device to cause deenergization of said differential relay.

12. A circuit arrangement according to claim 1, comprising a line relay in said adapter, said line relay having an energizing winding and an opposing winding, a differential relay constituting said control relay means, means effective while a call is in progress for connecting the opposing winding of said line relay in parallel to said differential relay, and means effective upon termination of said call for causing deenergization of said differential relay after effecting deenergization of said line relay.

References Cited in the file of this patent

UNITED STATES PATENTS

| | | |
|---|---|---|
| 2,090,171 | Wolf | Aug. 17, 1937 |
| 2,090,172 | Wolf | Aug. 17, 1937 |
| 2,106,881 | Wolf | Feb. 1, 1938 |
| 2,228,392 | Kiner | Jan. 14, 1941 |
| 2,281,508 | Lundstrom | Apr. 28, 1942 |
| 2,333,489 | Peterson | Nov. 2, 1943 |